(12) United States Patent
Tremblay

(10) Patent No.: US 6,381,309 B1
(45) Date of Patent: Apr. 30, 2002

(54) PERSONAL COMPUTER HAVING A SOUND CARD

(75) Inventor: Jacques Tremblay, Montréal (CA)

(73) Assignee: Auristar Technologies Inc., Montreal (CA)

(*) Notice: Subject to any disclaimer, the term of this patent is extended or adjusted under 35 U.S.C. 154(b) by 0 days.

(21) Appl. No.: 09/527,588

(22) Filed: Mar. 17, 2000

(51) Int. Cl.7 .............................................. H04M 11/00
(52) U.S. Cl. .......................... 379/52; 379/38; 379/90.01
(58) Field of Search ........................ 379/52, 38, 93.26, 379/90.01, 93.05, 93.08; 375/343; 704/216, 218

(56) References Cited

U.S. PATENT DOCUMENTS

| 4,306,308 A | * 12/1981 | Nossen ........................ 375/367 |
| 5,253,285 A | 10/1993 | Alheim |
| 5,450,470 A | 9/1995 | Alheim |
| 5,457,731 A | 10/1995 | Witherspoon |
| 5,627,530 A | 5/1997 | Israel et al. |
| 5,872,836 A | 2/1999 | Suffern et al. |
| 5,905,476 A | 5/1999 | McLaughlin et al. |
| 5,991,723 A | 11/1999 | Duffin |
| 6,181,736 B1 | * 1/2001 | McLaughlin et al. .... 379/93.01 |

* cited by examiner

Primary Examiner—Huyen Le
Assistant Examiner—Melur Ramakrishnaiah
(74) Attorney, Agent, or Firm—Ogilvy Renault; James Anglehart

(57) ABSTRACT

Telephone Device for the Deaf (TDD transitive) for a computing system and method of encoding and decoding TDD signals are described. The apparatus includes a sound card enabled to transmit and receive TDD coded Frequency Keying modulated audio signals. In extracting characters from a received audio signal, the sound card is used to sample the received audio signal. In extracting data bits from the received audio signal, groups of samples representing portions of the received signal are correlated against two frequencies.

15 Claims, 3 Drawing Sheets

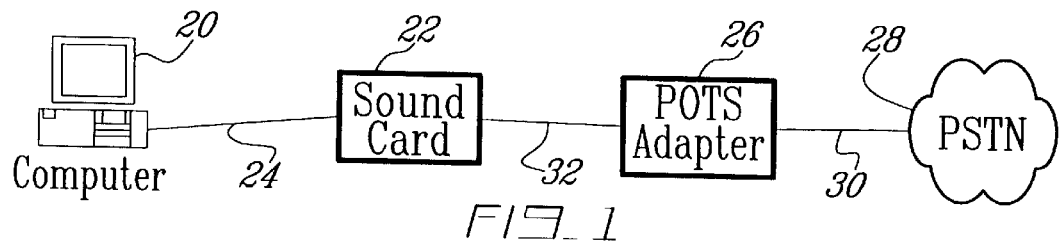
FIG_1
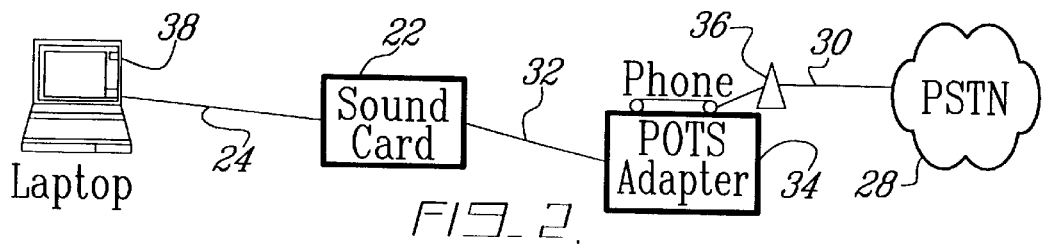
FIG_2
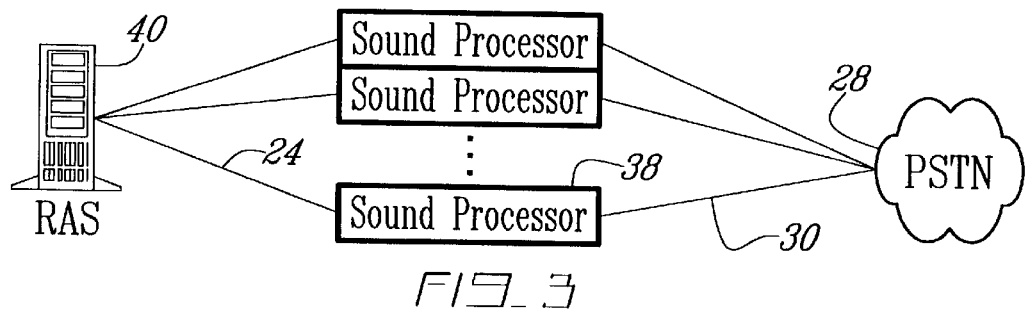
FIG_3
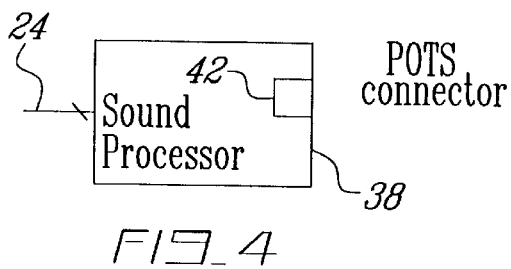
FIG_4
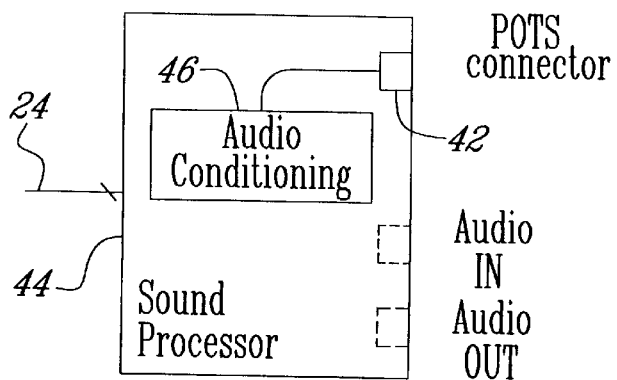
FIG_5

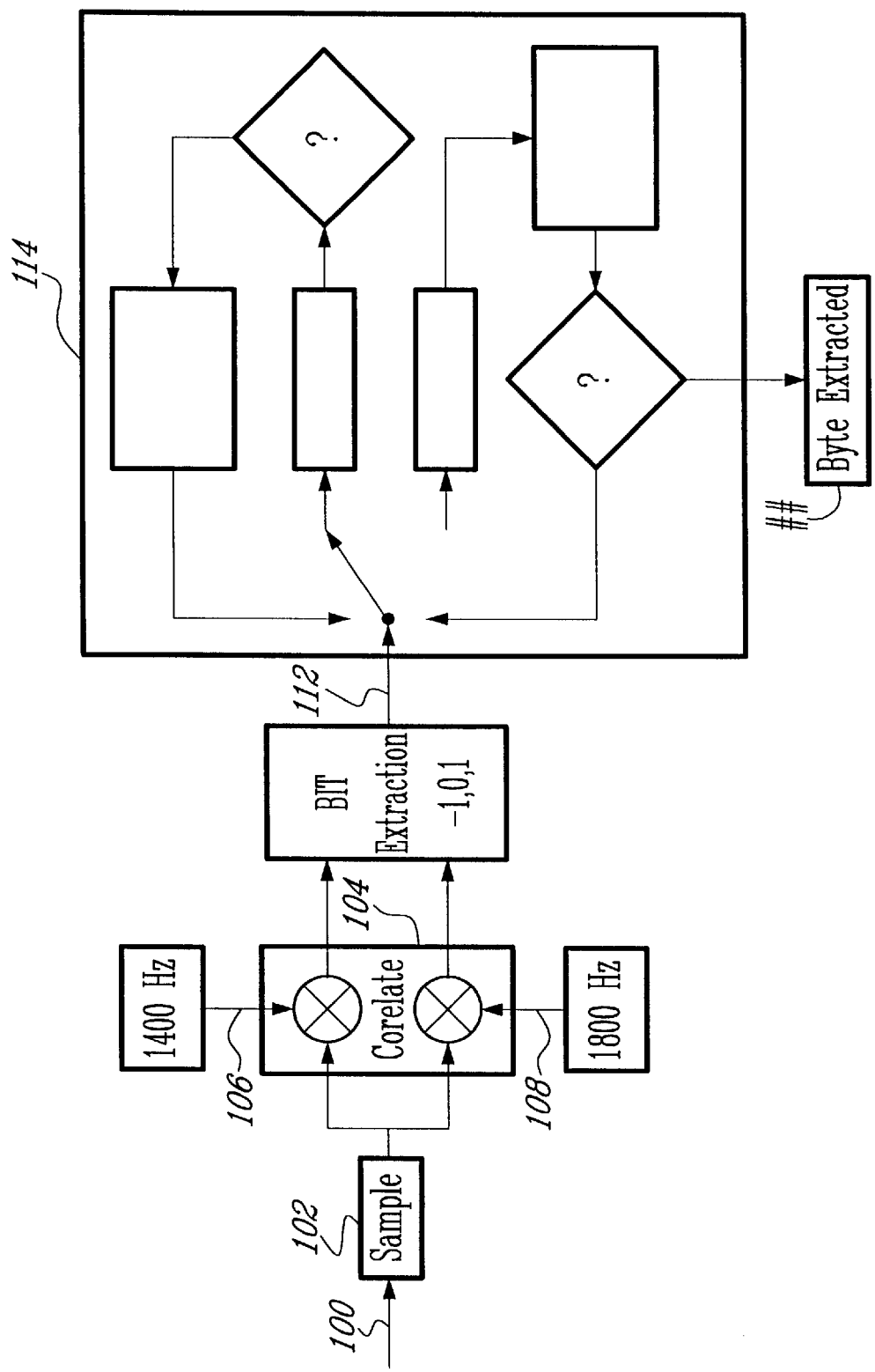
FIG_9

PERSONAL COMPUTER HAVING A SOUND CARD

TECHNICAL FIELD

The invention relates to telecommunication devices, and in particular to apparatus and method of encoding and decoding Telephone Device for the Deaf (TDD) signals.

BACKGROUND OF THE INVENTION

Telephone Devices for the Deaf (TDD transceivers) are used in communicating between two Public Switched Telephone Network (PSTN) terminations when voice can either not be understood or not possibly be transmitted such as is the case as one of the parties has at least a hearing or speech impediment respectively.

TDD transceivers are typically stand alone devices having a keyboard, a display and employ TDD signaling. TDD signaling is a term largely referring to the Baudot code which uses a 5 bit character encoding technique. A typical TDD terminal operates at 45.45 baud employing a carrier-less Frequency Keying as a modulation technique. The TDD transport protocol is asynchronous and uses 1 start bit, 5 data bits, and 1.5 stop bits. Each conveyed symbol represents a single bit. The bit representation includes a 1400 Hz tone (1) or a 1800 Hz tone (0). Silence between characters is tolerated. The carrier-less characteristic of the TDD signals enables TDD calls to be put on hold and/or transferred.

The field of communications is replete with transitive designs and data transfer protocols. In spite of that fact, TDD transitive technology has remained largely unchanged since its introduction.

Only a relatively small number of TDD transceivers exist in use. This is due in part to the fact that only a small fraction of the population is affected by hearing and/or speech impediments. Due to the relatively small market for TDD transceivers, the prices of these devices are very high compared to a telephone set. The high price of TDD devices has affected the market penetration of these devices. Market penetration of TDD devices is significantly less percentage wise when compared to the penetration of telephone sets.

The greatest disadvantage resulting from the lack of market penetration or wide spread use of TDD is the inability of friends and associates of people with hearing or speech impediments from communicating with the latter. Although recent trends have brought about legislation imposing equal access to all services by all persons regardless of disabilities, most small companies, and still some larger companies, do not provide customer access to services via TDD connections. Although the market is small on both sides, users and service providers would benefit from an increase in market penetration of these devices.

The obstacles to acquiring TDD capability are both a matter of cost for the specialized equipment as well as integration of the specialized equipment within existing telecommunications/network equipment.

Novel methods of providing TDD services have been previously proposed. U.S. Pat. No. 5,905,476 entitled "ITU/TDD MODEM" which issued to McLaughlin et al. on May 18th, 1999, proposes the reuse of a modified modem. Although this proposition has merit, the solution proposed essentially is a modified modem which introduces a few problems.

Modems and modem protocols typically use modulation techniques employing carrier frequencies in transporting data and maintaining connections. This attribute makes it impossible for a modem connection to be put on hold and/or transferred because losing the carrier frequency is commonly attributed with a loss of connectivity and the modem disconnects. McLaughlin et al. provides solutions for this problem at the cost of an increased complexity by the use of special firmware and/or the use of an extended data transfer protocol leading to increased manufacturing and perhaps maintenance costs.

Another problem stems from the fact that companies are very sensitive to the addition of modems to their computers as a result of a perceived security threat. TDD communications are an essential alternative path for voice communications, which do not pose any security risk. Thus, the integration of modem communications to handle TDD communications presents a need to manage and control this possible security risk created by the connection of a modem to a company's network. McLaughlin et al. provides solutions for this problem at the cost of an increased complexity special firmware and/or the use of an extended data transfer protocol leading to increased manufacturing and perhaps maintenance costs.

Therefore there is a need to provide novel apparatus and methods for supporting TDD telecommunications at a reasonable cost while adhering to common protocols, standards and corporate security needs.

SUMMARY OF THE INVENTION

It is an object of the invention to reuse a sound card, typically provided with a computer as purchased or available at a minimal cost, as a TDD transitive.

It is another object of the invention to enable TDD telecommunications via a sound card connected to a local loop using a simple adapter typically only having dynamic range matching components necessary in coupling a local loop to the soundcard.

It is yet another object of the invention to enable TDD telecommunications via a sound card such that the only modification required to a computer having an installed sound card coupled to a telephone line is a software installation upgrade.

According to a broad aspect of the invention a Telephone Device for the Deaf (TDD transitive) adapted for TDD signaling is provided. The TDD transitive comprises: a sound processor adapted to sample a received audio signal and generate a transmit audio signal, each audio signal having a frequency; and at least one correlator adapted to discriminate between at least two states representing samples derived from the received audio signal.

According to another aspect of the invention a TDD transitive further comprises a POTS adapter enabling the sound processor to operatively interface with a local loop.

According to a further aspect of the invention the POTS adapter further comprises an audio signal conditioning component adapted to match local loop characteristics to audio input and audio output characteristics of the TDD transitive; and a POTS connector operatively connected to the audio signal conditioning component adapted to receive the local loop.

According to yet another aspect of the invention the POTS adapter further comprises an audio coupler adapted to interface with and convey audio signals to and from a telephone handset.

According to another broad aspect of the invention a method of decoding a TDD coded frequency keying modulated received audio signal is provided. The method comprises a sequence of steps. The received audio signal is sampled and at least two frequencies discriminated.

According to another aspect of the invention, the method further comprises the step of assigning one of a first and a second logic states corresponding to one of the two frequencies based on a level of correlation between a group of samples representing the received audio signal and one of the first and second reference audio signals in extracting data bits from the received audio signal.

According to yet another aspect of the invention, the method further comprises extracting a character from the received audio signal. A start bit is detected upon assigning the first logic state to a group of samples following silence. preset number of data bits are detected and assigned logic states corresponding respective groups of samples representing the received audio signal. And, a stop bit is detected upon assigning the second logic state to a group of samples following the detection of the preset number of data bits.

BRIEF DESCRIPTION OF THE DRAWINGS

Further features and advantages of the present invention will become apparent from the following detailed description, taken in combination with the appended drawings, in which:

FIG. 1 is a diagram showing interconnected elements according to a first exemplary embodiment of the invention;

FIG. 2 is a diagram showing interconnected elements according to a two second exemplary embodiment of the invention;

FIG. 3 is a diagram showing interconnected elements according to a third exemplary embodiment of the invention;

FIG. 4 is a diagram showing a detail according to the third exemplary embodiment of the invention;

FIG. 5 is a diagram showing another detail according to the third exemplary embodiment of the invention;

FIG. 9 is a flow diagram showing a process by which a Telephone Device for the Deaf (TDD transitive) decodes a TDD coded Frequency Keying modulated received audio signal.

It will be noted that throughout the appended drawings, like features are identified by like reference numerals.

DETAILED DESCRIPTION OF THE EMBODIMENTS

Figure 6:
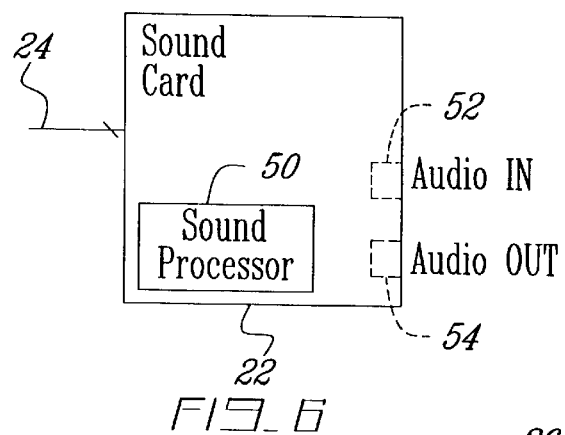
FIG. 6 is a diagram showing a detail according to the first and second exemplary embodiments of the invention.

FIG. 1 is a diagram showing interconnected elements according to a first exemplary embodiment of the invention.

According to the first exemplary embodiment of the invention, a Telephone Device for the Deaf (TDD transitive), for use with a computing system such as a Personal Computer (PC) 20, includes a sound card 22. The sound card 22 is typically a feature expansion card which can be removably connected to the PC 20 or can be an integral built-in component to the PC 20. In either case, the sound card 22 interfaces to the PC 20 via a data bus 24. A multitude of implementations of sound cards exists. Each particular sound card besides having operational characteristics is typically categorized by a data bus type to which the sound card interfaces. Data bus types span multiple computing platforms provided by many vendors and have different data transfer capabilities.

According to the first exemplary embodiment, the TDD transitive also includes a Plain Old Telephone Service (POTS) adapter 26. The POTS adapter 26 interfaces with a PSTN 28 via a local loop 30 and with the sound card 22 using audio cables as shown generally at 32.

FIG. 2 is a diagram showing interconnected elements according to a second exemplary embodiment of the invention.

According to the second exemplary embodiment, the TDD transitive includes a POTS adapter 34 adapted to interface with the PSTN 28 via a telephone set 36 having a handset. Also shown in FIG. 2 is a laptop computer 38 to which the sound card 22 interfaces. Implementations of the sound card 22, besides built-in variants, include feature expansion cards such as PCMCIA and the like. In interfacing with the laptop computer 38, the sound card 22 can be removably connected via to the data bus 24 such as a PCMCIA bus. Other sound card variants adapted to interface with a laptop exist including printer port connectable variants.

All sound card variants represent a subset of sound processors and in particular a subset of sound processors adapted to interface with a computing system.

FIG. 3 is a diagram showing interconnected elements according to a third exemplary embodiment of the invention.

According to the third embodiment of the invention, the TDD transitive includes a sound processor 38 adapted to interface directly to the PSTN 28 via a local loop 30 and to a computing system such as a Remote Access Server (RAS)/Dial-up Access Server (DAS) 40 via the data bus 24.

Remote Access Servers/Dial-up Access Servers are typically used in environments such as a call center or in a large enterprise. In such environments, the TDD transceivers are shared between a plurality of computing systems (not shown) addressable from the RAS/DAS 40. Typically a plurality of TDD transceivers such as 38 interface with the RAS/DAS 40 either individually via data bus interfaces as shown at 24 or a shared such interface. The TDD transceivers 38 for use with the RAS/DAS 40 include discrete multiple feature expansion cards or a single feature expansion card having multiple integrated sound processors. In this environment and dependent on a particular combination of sound processors, the interface with the PSTN 28 can either include individual local loops one for each sound processor or at least one telephone trunk (not shown).

FIG. 4 is a diagram showing a detail according to the third exemplary embodiment of the invention. As mentioned with respect to FIG. 3 the TDD transitive sound processor 38 of a discrete feature expansion card interfaces directly with a local loop via a POTS connector 42. The multiple integrated sound processors variant (not shown) can also have a POTS connector for each individual sound processor on the feature expansion card; typically such feature expansion card would interface with a telephone trunk via a trunk adapter (not shown). The data bus interface 24 is also schematically shown as having multiple lines.

Implementations of sound processors for interfacing with computing systems typically draw power from the data bus 24 which typically operates at or bellow 5 V although 12 V power feeds on the data bus 24 are commonly provided. An audio signal conditioning component may be necessary as a means of matching dynamic ranges of audio signals transferred over the local loop and the dynamic range of the sound processor. Alternatively the sound processor may draw operating power from the local loop, as provided from a central office to which local loop connects, in which case the sound processor can operate at local loop voltages requiring voltage conversion only at the interface with the data bus 24.

FIG. 5 is a diagram showing another detail according to the third exemplary embodiment of the invention.

A TDD transitive sound processor 44 includes an audio signal conditioning component 44 connected to the POTS connector 42. Optionally the sound processor 44 includes audio IN and audio OUT connectors.

FIG. 6 is a diagram showing a detail according to the first and second exemplary embodiments of the invention. As mentioned above all sound card variants represent a subset of sound processors and in particular a subset of sound processors adapted to interface with a computing system. The sound card 22 is shown to include a sound processor 50. In processing sound, the sound card 22 is provided with audio connectors and in particular with an audio IN connector 52 and an audio OUT connector 54. The audio connectors 52 and 54 are used to receive audio cables 32.

Typically a sound card is not adapted to interface directly to a local loop in which cage the POTS adapter 26 or 34 is used.

Figure 7:
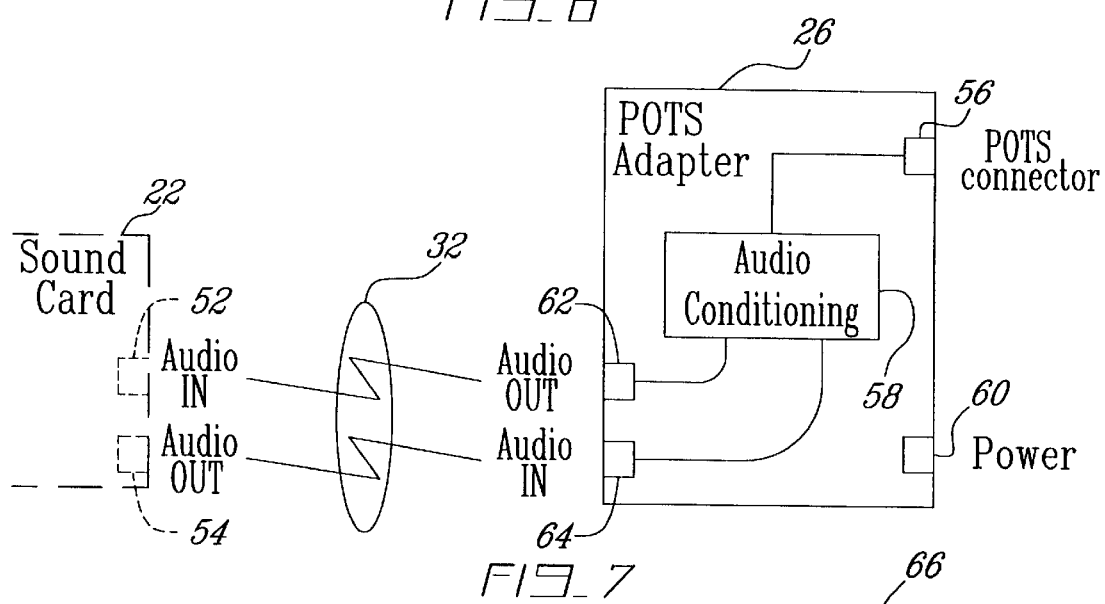
FIG. 7 is a diagram showing a detail according to the first exemplary embodiment of the invention.

FIG. 7 is a diagram showing a detail according to the first exemplary embodiment of the invention. The POTS adapter 26 has a POTS connector 56 for receiving a local loop connected to an audio signal conditioning component 58. The audio signal conditioning component 58 is adapted to match dynamic ranges between the sound card 22 and the local loop, match line impedances and/or in general protect the sound card 22 from high currents on the local loop. In operation, the POTS adapter 26 may draw operating power from the local loop or externally via a power connector 60. The POTS adapter 26 exchanges audio signals with sound card 22 via an audio OUT connector 62 and an audio IN connector 64 to which the audio cables 32 connect.

Figure 8:
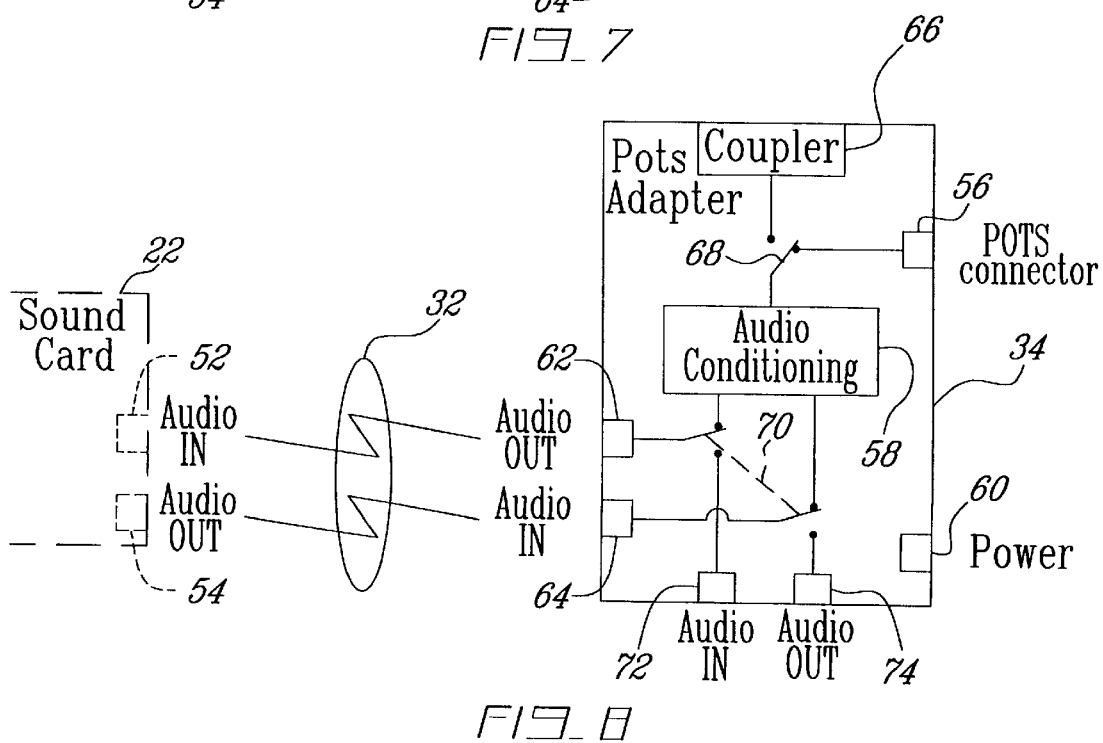
FIG. 8 is a diagram showing a detail according to the first and second exemplary embodiments of the invention.

FIG. 8 is a diagram showing a detail according to the first and second exemplary embodiments of the invention. The POTS adapter 34, in being adapted to interface with a telephone handset of a telephone 36, is provided with an audio coupler 66. The audio coupler 66 is adapted to mechanically matingly engage, via cups or the like, a speaker part and a microphone part of the handset in exchanging audio signals. A switch 68 is used in providing a choice between transferring audio signals via the POTS connector 56 or the audio coupler 66. The state of the switch may affect the functionality of the audio signal conditioning component 58. The audio signal conditioning component 58 may also be autosensing with respect to the dynamic ranges of audio signals associated with the POTS connector 56 and the audio coupler 66 perhaps providing automatic gain control.

The POTS adapter 34 may also provide pass-through access to the sound card 22 via a switch 70, an audio IN connector 72 and an audio out connector 74. The pass-through mode of operation may be used in operating the sound card 22 as a sound card proper when not operating as a TDD transitive or may be used in connecting the POTS adapter 34 to a telephone set having audio IN and audio OUT connectors. Telephone sets having audio IN and audio OUT connectors are commonly used at receptionist stations and the like.

With the apparatus as described above, it is understood by a person skilled in the art of computer sound synthesis, how to transmit TDD signals using the TDD transitive described in the above embodiments. It is only necessary to install appropriately coded telecommunications software on the computing system using the TDD transitive.

A novel process used in receiving TDD signals is described below. The process is used in combination with the above mentioned appropriately coded telecommunications software.

The process makes use of existing functionality of the sound card 22/sound processor 38, 44 such as audio signal sampling, sound processing including correlational frequency detection, if available, and simple combinatorial logic, if available. Functions such as correlational frequency detection and simple combinatorial logic are provided typically via Digital Signal Processors (DSP) available on some sound cards. Alternatively, the correlational frequency detection and combinatorial logic can be provided through the use of the above mentioned installable telecommunications software. Due to the slow transfer rate of TDD information either implementation can substantially provide real time operation.

FIG. 9 is a flow diagram showing a process by which a Telephone Device for the Deaf (TDD transitive) decodes a TDD coded Frequency Keying modulated received audio signal.

A received analog audio signal 100, is sampled at 102. Sampling is to be done at a sufficiently high rate to extract enough information from the received audio signal 100 in correctly decoding the received audio signal 100. Choice of the sampling rate is important since the TDD data transfer protocol does not provide error checking.

Since the TDD signal is Frequency Keying modulated, frequency discrimination is needed. According to theory known to persons of skill in the art of signal sampling, the minimum sampling frequency should be at least two times larger than a frequency to be discerned. In using one sampler 102 to provide samples in discerning between two frequencies, the sampling rate should be at least two times larger than the larger of the frequencies. Sound cards are adapted to sample at 8 kHz and faster rates which provides a more than adequate sampling rate. Slower sampling rates provide fewer samples to be used in correlational computations providing a closer to real time response at the expense of larger error margins.

The samples are provided to a correlator 104 in groups. The correlator 104 provided with synthesized 1.4 kHz samples 106 and with synthesized 1.8 kHz samples 108. Correlation results are provided for each group to a data bit extractor 110. The data bit extractor 110, based on the correlation results for at least one group outputs a correlational state 112 which represents one of the following conditions: no correlation was detected therefore no signal is being transmitted, correlation successful at 1.8 kHz, and correlation successful at 1.4 kHz. The state corresponding to correlation successful at 1.8 kHz and 1.4 kHz can either be undefined perhaps generating an error or be assigned to a state representing local loop conditions such as voice detection, flash, transfer or the like.

The correlational state output 112 is provided to a character extractor 114. The character extractor 114 extracts characters in accordance with the TDD data transfer protocol outlined above. The character extractor 114 detects a start bit from a state transition from silence to a state in which a 1.8 kHz signal is detected for a one data bit time period. Upon detecting the start bit the character extractor 114 accumulates data bits in giving logic levels to detected frequency correlational states and failing on silence or error detection. If 5 data bits are correctly accumulated and a stop bit is detected as a sustained 1.4 kHz signal for at least one and a half times of a one data bit time period, then a character is considered to have been correctly decoded and is subsequently provided over the data bus 24.

Preferably the received audio signal is sampled such that a sample group represents a time portion of a data bit transfer time. According to an exemplary implementation data bit transfer time is divided into six time portions. A data bit is extracted if a predetermined number, e.g. four, of the sample groups successfully correlate to yield the same result. Once a data bit is extracted, the arrival of a different data bit can be recognized as the start of a new data bit. When a subsequent data bit is the same as the previous data bit in a character, the character extractor 114 begins evaluating as the next data bit the sample groups corresponding to the time portions following the six sample time portions making up the previous data bit.

If the sender does not respect the standard for data bit time duration, or if the character extractor 114 is not properly calibrated, then errors due to lack of proper synchronization are compensated within the allowed 33% margin according to the exemplary implementation.

The arrival of the stop bit lasting for nine sample group time portions (or at least more than seven, which is believed to be the maximum difference in synchronization), provides an unambiguous indication of the end of the character.

The above mentioned sampling, bit extraction and character extraction techniques are employed due to the asynchronous data transfer of the TDD transfer protocol. Synchronization of can be derived by the TDD from a clock signal used in sampling the received audio signal as well as taking into consideration the data transfer rate of the protocol. Synchronization can be replaced by sample counting which can be initialized on detecting a start bit or other similar techniques.

In the spirit of the invention, another embodiment of the invention (not shown) would make use of an Integrated Services Data Network (ISDN) transitive and appropriately coded software.

According to this embodiment, on receiving an audio TDD signal, the ISDN transitive is configured to pass the received data through to the software. The advantage comes from the fact that a received audio signal sent via an ISDN link is in a same digital form in which the received audio signal is transported over the PSTN. This digital form of the received audio signal is already sampled at 8 kHz. The correlator, the bit extractor and the character extractor are implemented in the software which executes on the computing system.

According to this embodiment, on sending an audio TDD signal, the ISDN transitive is configured to pass a generated data stream through at 8 kHz. The software is responsible for translating the TDD character set into the data stream and provide that stream to the ISDN transitive at a rate of 8000 samples per second.

In the spirit of the invention, another embodiment of the invention (not shown) TDD communications can be adapted to Voice-over-Internet Protocol (VoIP) via an appropriately coded software.

According to this embodiment, in receiving TDD signals the software is provided with the raw data stream as extracted from Transport Control Protocol/Internet Protocol (TCP/IP) packets via a network adapter. This digital form of the received audio signal is typically sampled at 8 kHz.

According to this embodiment, in transmitting TDD signals the software generates from a character stream to be sent, a data stream, represented by digital samples provided to the network adapter at a rate of 8000 samples per second.

According to yet another embodiment of the invention, a computing system such as a RAS/DAS can be provided with a PSTN adapter operatively receiving at least one PSTN trunk. As PSTN trunks convey digitized sound at 8 kHz in time slices according to a Time Division Multiplexed (TDM) transport protocol, a TDD connection corresponds to a particular time slice every 125 microseconds. Each time slice therefore corresponds to a sample according to the invention. The correlation, bit extraction and character extraction steps can be implemented in a combination of software applications executing on the RAS/DAS and firmware associated with the PSTN adapter.

The embodiments of the invention described above are intended to be exemplary only. The scope of the invention is therefore intended to be limited solely by the scope of the appended claims.

What is claimed is:

1. A Telephone Device for the Deaf (TDD) transitive adapted for TDD signaling and associated with a computer, the TDD transitive comprising:

a) a sound processor adapted to receive a digital audio signal and generate a transmit audio signal, wherein said sound processor is a sound card adapted to sample an analog signal to generate said digital audio signal and interface with a computing system, said sound card having a first audio input and a first audio output;

b) a correlator provided in the computer and adapted to discriminate between at least two audio tone states found in said digital audio signal and to output a received data stream signal, wherein said correlator discriminates between said at least two audio tone states a number of times per bit time slot, said correlator determining bit values based on a count of said audio tone states discriminated; and c) a Plain Old Telephone Service (POTS) connector adapted to connect said first audio input and said first audio output to a local loop and to match an impedance of a local loop to an impedance of said first audio input and to an impedance of said first audio output.

2. A TDD transitive as claimed in claim 1, wherein the computing system further comprises a personal computer.

3. A TDD transitive as claimed in claim 1, wherein the computing system further comprises a Remote Access Server (RAS).

4. A TDD transitive as claimed in claim 1, wherein the sound processor is further adapted to sample the received audio signal at a rate of 8 kHz.

5. A TDD transitive as claimed in claim 1, wherein discriminating between at least two states, the correlator is further adapted to discriminate a third state representing silence.

6. A TDD transitive as claimed in claim 1, wherein the TDD signaling includes Frequency Keying discriminating between at least two states, and the correlator is further adapted to associate a logic state with corresponding group of samples derived from the received audio signal.

7. A TDD transitive as claimed in claim 6, wherein associating a logic state with a corresponding group of samples, the correlator is further adapted to associate a first logic state with a group of samples representing a portion of the received audio signal having a high frequency.

8. A TDD transitive as claimed in claim 1, wherein the TDD signaling comprises asynchronous transfer of characters and TDD transitive further comprises a character extractor operatively connected to the correlator adapted to compile a character from a sequence of states provided by the correlator.

9. A TDD transitive as claimed in claim 8, wherein the character extractor is further adapted to detect a start of a character transfer from a particular sequential combination of states.

10. A TDD transitive as claimed in claim 8, wherein the character extractor is further adapted to detect an end of a character transfer from a particular sequential combination of states.

11. A TDD transitive as claimed in claim 1, wherein the POTS adapter further comprises:

a) an audio input connector adapted to receive audio signals;

b) an audio output connector adapted to provide audio signals; and c) a first switch, the first switch being adapted to connect the audio input connector and the audio output connector to the sound processor via the second audio output and the second audio input, respectively and the switch being further adapted to disconnect the audio input connector and the audio output connector otherwise.

12. A TDD transitive as claimed in claim 1, wherein the POTS adapter further comprises:

a) an audio coupler adapted to interface with and convey audio signals to and from a telephone handset; and b) a second switch, the second switch being adapted to connect the audio coupler to the audio signal conditioning component and the switch being further adapted to disconnect the audio coupler otherwise.

13. A method for communicating with a Telephone Device for the Deaf (TDD), said method comprising:

establishing point to point communication between said TDD and a second terminal;

determining according to a protocol a sequence of at least two tones representing an outgoing character data stream;

preparing a digital audio signal using tone data corresponding to said sequence;

transmitting a data stream corresponding to said digital audio signal to said TDD;

receiving an audio signal from said TDD;

providing a digital representation of said received audio signal to a correlator;

correlating said digital signal with at least two audio tone states;

outputting a correlation result signal; and analyzing said correlation result signal according to a protocol to generate a received data stream.

14. A method as claimed in claim 13, further comprising providing a sound card and a POTS connector adapted to receive a local loop, wherein said step of receiving an audio signal from said TDD further comprises converting an analog signal into said digital representation, and said step of transmitting a data stream further comprises converting said data stream into a transmit analog signal.

15. A method as claimed in claim 13, wherein said receiving an audio signal from said TDD further comprises receiving said audio signal from a data network and said transmitting a data stream further comprises transmitting said data stream through a date network.

\* \* \* \* \*

UNITED STATES PATENT AND TRADEMARK OFFICE
CERTIFICATE OF CORRECTION

PATENT NO.      : 6,381,309 B1
DATED           : April 20, 2002
INVENTOR(S)     : Jacques Tremblay It is certified that error appears in the above-identified patent and that said Letters Patent is hereby corrected as shown below:

<u>Column 8,</u>
Lines 21, 23, 43, 45, 48, 51, 55, 60, 65 and 67, please change all occurrences of "transitive" to -- transceiver --.

<u>Column 9,</u>
Lines 4, 8, 12 and 25, please change all occurrences of "transitive" to -- transceiver --.

Signed and Sealed this

Seventh Day of October, 2003

JAMES E. ROGAN
*Director of the United States Patent and Trademark Office*